Feb. 6, 1945.  C. J. SCHULER  2,368,887

SYNTHETIC POPPET VALVE

Filed Nov. 30, 1943

CARL J. SCHULER,
INVENTOR.

BY
ATTORNEY.

Patented Feb. 6, 1945

2,368,887

UNITED STATES PATENT OFFICE 2,368,887

SYNTHETIC POPPET VALVE

Carl J. Schuler, Los Angeles, Calif., assignor to Interstate Aircraft and Engineering Corp., a corporation of California Application November 30, 1943, Serial No. 512,323

3 Claims. (Cl. 251—159)

This invention relates to valves, particularly of the type known as poppet valves.

In the ordinary poppet valve as constructed the movable valve member or poppet is ordinarily made of steel, having a conical face which engages a steel or other metal composition seat. In such valves it is necessary that the valve be lapped in to the seat as it is necessary that the valve and seat should make a tight fit throughout the engaging surfaces. These valves, due to the engagement of metal against metal, very often score or get out of alignment and in many instances, when a gritty foreign matter lodges on the seat the valve does not tightly close with consequent leakage past the valve.

It is an object of the present invention to produce a valve member or valve in which a steel core is employed having molded thereon a plastic which entirely covers the core with the exception of the foot or enlarged lower end which is engaged by the lifting cam. In this structure the body of plastic is molded to form a conical surface for engagement with a valve seat, such conical surface being to a certain extent yieldable permits a proper fitting of the valve member on the seat without the ordinary lapping in operation and also in the event grit lodges upon the seat, such grit imbeds itself in the conical surface and therefore does not interfere with the proper seating of the valve.

Another object of the invention is to produce a valve of the character described of simple form and construction which is so made that the plastic body of the valve is firmly secured to the metal core so that there is no parting or separation of the plastic body from the core.

Another object of this invention is to produce a valve of the character described of simple form and construction which requires no machining or lapping in for proper assembly with the valve structure in which it is to be used.

It is to be understood that the term plastic as used herein has reference to and includes any synthetic or natural material or combinations thereof that is susceptible of being formed about a steel core.

Other objects and advantages will appear hereinafter from the following descriptions and drawing.

Referring to the drawing, which is for illustrative purposes only—

Figure 1:
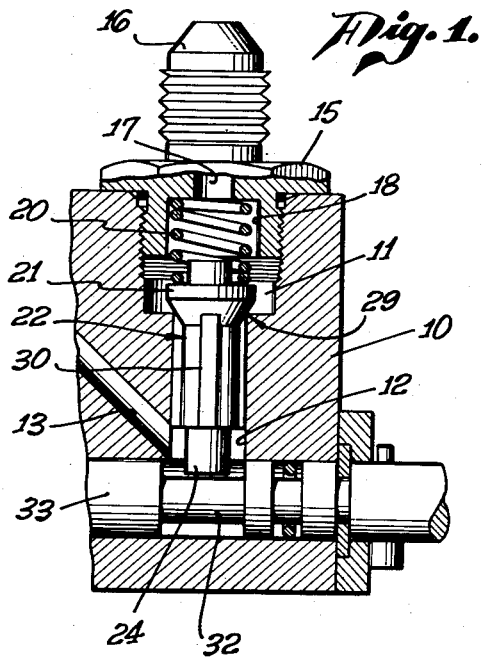
Fig. 1 is a vertical sectional view of a valve assembly showing mounted therein a valve embodying a form of my invention.
Figure 2:
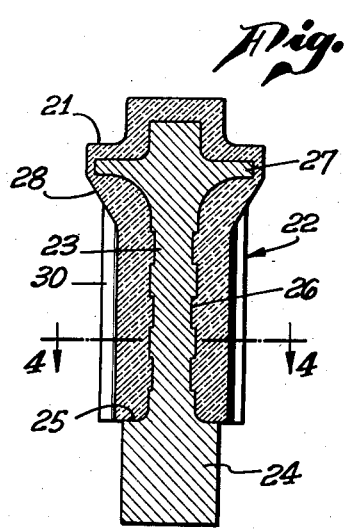
Fig. 2 is a vertical sectional view of the valve member shown in Fig. 1.
Figure 3:
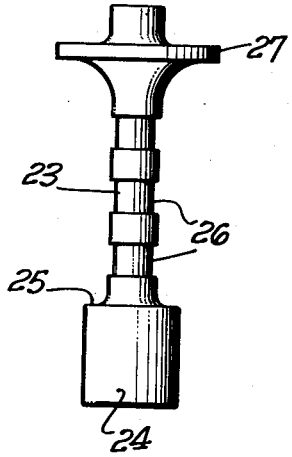
Fig. 3 is a vertical side elevation of the core of the valve member shown in the preceding figures.
Figure 4:
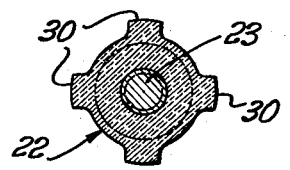
Fig. 4 is a sectional plan view on line 4—4 of Fig. 2.
Figure 5:
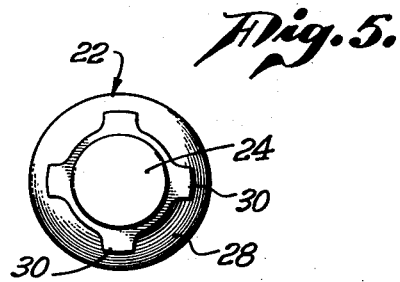
Fig. 5 is a bottom plan view of the valve member shown in Fig. 2.

Referring more particularly to the drawing, 10 indicates a valve casing having a valve chamber indicated at 11 and a valve passage indicated at 12, and a port indicated at 13 leading from the valve passage 12. The upper end of the valve chamber 11 is closed by a screw plug indicated at 15, such plug having a threaded nipple 16 formed thereon through which an inlet port indicated at 17 extends. The inlet port 17 opens into a recessed portion 18 of the plug 15 which recess houses a coiled compressing spring indicated at 20, the upper end of which bears against the end of the recess in the plug and the lower end of which is seated on a shoulder 21 formed on the valve member generally indicated at 22.

The valve member 22 consists of a steel core indicated at 23. This steel core is formed at its lower end with an enlarged foot indicated at 24 terminating in a shoulder indicated at 25. The core is circular in cross section and is provided with a series of circular grooves indicated at 26. Above the grooves and adjacent to the upper end of the core is a circular flange indicated at 27.

This core 23 is covered with the exception of the foot 24 with a molded body of plastic, it being understood that the term plastic embraces rubber compositions and the like. The plastic is molded on the steel core with the lower end of the plastic body abutting the shoulder 25 on the foot 24 and is provided at its upper end with a shoulder 21 heretofore referred to which forms a seat for the compression spring. Below the flange 27 the sides of the plastic body are conical in shape as indicated at 28, such conical face being adapted to engage a valve seat indicated at 29 in Fig. 1. Extending from the lower end of the plastic body to the conical seat 28 is a plurality of longitudinal ribs indicated at 30. These ribs space the body of plastic away from the sides of the passage 12 so that when the valve is open there is a free passage around the valve member.

The foot 24 being of steel or other metal is adapted to be engaged by a lifting cam indicated at 32 in Fig. 1. The cam as illustrated is formed as a part of a camshaft indicated at 33.

From the above description it will be readily understood that the plastic is prevented from longitudinal movement on the metal core and that the flange 27 on the core not only prevents longitudinal movement of the plastic on the core but also serves as reenforcement for the shoulder 21, which is engaged by the spring 20. The flange 27 also reenforces the plastic body directly above the conical seat engaging face of the valve member. In addition to the flange 27, the plastic body being molded into the recesses 26 on the core, an additional locking of the plastic body on the core is accomplished.

The conical face of the valve member being of plastic it will adjust itself to the valve seat without the ordinary lapping in operation and insure a closure of the valve under all conditions as the valve is held upon the seat not only by the spring 20 but also by the pressure in the valve chamber above the valve.

It is contemplated that various modifications and changes can be made in the invention as shown and described herein without departing from the scope of the invention and it is intended to cover such changes and modifications as come within the scope of the claims.

I claim as my invention:

1. A valve member comprsing; a metal core, an enlarged foot on one end of said core, a flange adjacent the other end of said core, a molded body of plastic on said core extending from said foot over the other end of said core, said molded body having a downwardly converging conical face formed thereon adapted for engagement with a valve seat, and a plurality of longitudinally extending ribs on said body formed as a part of said body and extending longitudinally from the conical face of said body.

2. A valve member comprising; a metal core, an enlarged foot on the lower end of said core, a flange adjacent the upper end of said core, a molded body of plastic extending from said foot over the upper end of said core, said molded body having a downwardly converging conical face formed thereon below the flange on said core adapted for engagement with a valve seat and a spring engageable shoulder formed on said molded body above the flange on said core.

3. A valve member comprising; a metal core having a plurality of circumferential grooves formed therein, an enlarged foot formed on the lower end of said core, a flange formed on said core adjacent to the upper end of said core, a molded body of plastic on said core extending from the foot on said core over the upper end of said core, said molded body having a conical face formed thereon adapted for engagement with a valve seat, a plurality of longitudinal ribs on said body extending from the lower end of said body to the conical face thereon, and a shoulder on said body above the flange on said core.

CARL J. SCHULER.